United States Patent
Vandikas et al.

(10) Patent No.: US 11,916,931 B2
(45) Date of Patent: Feb. 27, 2024

(54) METHODS FOR PROTECTING PATTERN CLASSIFICATION NODE FROM MALICIOUS REQUESTS AND RELATED NETWORKS AND NODES

(71) Applicant: Telefonaktiebolaget LM Ericsson (publ), Stockholm (SE)

(72) Inventors: Konstantinos Vandikas, Solna (SE); Leonid Mokrushin, Uppsala (SE); Maxim Teslenko, Sollentuna (SE); Daniel Lindström, Luleå (SE); Marin Orlic, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 310 days.

(21) Appl. No.: 17/606,111

(22) PCT Filed: Apr. 24, 2019

(86) PCT No.: PCT/EP2019/060529
§ 371 (c)(1),
(2) Date: Oct. 25, 2021

(87) PCT Pub. No.: WO2020/216442
PCT Pub. Date: Oct. 29, 2020

(65) Prior Publication Data
US 2022/0311784 A1     Sep. 29, 2022

(51) Int. Cl.
*H04L 9/40*     (2022.01)
*G06N 3/04*     (2023.01)

(52) U.S. Cl.
CPC ........... *H04L 63/1416* (2013.01); *G06N 3/04* (2013.01); *H04L 63/1425* (2013.01); *H04L 63/1491* (2013.01)

(58) Field of Classification Search
None
See application file for complete search history.

(56) References Cited

U.S. PATENT DOCUMENTS

2018/0063169 A1*   3/2018   Zhao .................. H04L 63/1416

OTHER PUBLICATIONS

International Search Report and Written Opinion of the International Searching Authority for PCT International Application No. PCT/EP2019/060529 dated Dec. 16, 2019.

(Continued)

*Primary Examiner* — Cai Y Chen
(74) *Attorney, Agent, or Firm* — Sage Patent Group

(57) ABSTRACT

A method of operating a protection node for protecting a pattern classification node from malicious requests may be provided. The protection node may receive, from a user node, a request containing an original pattern to be classified by a machine learning algorithm performed by the pattern classification node. The protection node may add noise to the original pattern to generate a noisy pattern. The protection node may obtain a first classification of the noisy pattern based on processing of the noisy pattern by a first clone of the machine learning algorithm at the protection node; obtain a second classification of the original pattern based forwarding the request for processing of the original pattern by the machine learning algorithm performed at the pattern classification node; and compare the first and second classifications to determine whether the first and second classifications satisfy a defined similarity rule. The protection node may use the comparison to manage the request from the user node.

20 Claims, 7 Drawing Sheets

$x$

"panda"
57.7% confidence $+.007 \times \mathrm{sign}(\nabla_x J(\theta, x, y))$

"nematode"
8.2% confidence $x + \mathrm{sign}(\nabla_x J(\theta, x, y))$

"gibbon"
99.3 % confidence

(56) References Cited

OTHER PUBLICATIONS

Kurakin et al., "Adversarial Examples in the Physical World," Workshop track—ICLR 2017, pp. 1-14.
Jin et al., "Robust Convolutional Neural Networks Under Adversarial Noise," Workshop track—CLR 2016, pp. 1-8.

* cited by examiner

US 11,916,931 B2

METHODS FOR PROTECTING PATTERN CLASSIFICATION NODE FROM MALICIOUS REQUESTS AND RELATED NETWORKS AND NODES

CROSS REFERENCE TO RELATED APPLICATION

This application is a 35 U.S.C. § 371 national stage application of PCT International Application No. PCT/EP2019/060529 filed on Apr. 24, 2019, the disclosure and content of which is incorporated by reference herein in its entirety.

TECHNICAL FIELD

The present disclosure relates generally to protecting networks, and more particularly to protecting pattern classification nodes from malicious requests.

BACKGROUND

Machine learning algorithms and particularly neural networks may be susceptible to a specific attack where a malicious user sends a carefully crafted input to confuse the neural network and may force it to produce an incorrect prediction/classification. A famous example of this is illustrated in FIG. 1, where noise may be added to a panda picture and then fed back to a Convolutional Neural Network (CNN, VGG-16) to incorrectly categorize it as a gibbon.

Such issues typically may be harmless and may be improved by retraining the original neural network to properly classify its input. However, there are cases where such approaches may be carefully constructed to cause more serious problems—for example, by adding a small amount of noise to the image of a stop sign it may be mislabeled as something else, causing a self-driving vehicle to ignore it and potentially cause an accident.

SUMMARY

According to some embodiments of inventive concepts, a method performed by a protection node for protecting a pattern classification node from malicious requests may be provided. The protection node may receive a request from a user node containing an original pattern to be classified by a machine learning algorithm performed by the pattern classification node. The protection node may add noise to the original pattern to generate a noisy pattern. The protection node may then obtain a first classification of the noisy pattern based on processing of the noisy pattern by the machine learning algorithm performed by the protection node. The protection node may obtain a second classification of the original pattern based on forwarding the request for processing of the original pattern by the machine learning algorithm performed by the pattern classification node. The protection node may then compare the first and second classifications to determine whether the first and second classifications satisfy a defined similarity rule. The protection node may use the comparison to manage the request from the user node.

According to some other embodiments of inventive concepts, a protection node may be provided. The protection node may include at least one processor, and at least one memory connected to the at least one processor to perform operations. The operations may include receiving, from a user node, a request containing an original pattern to be classified by a machine learning algorithm performed by the pattern classification node. The operations may further include adding noise to the original pattern to generate a noisy pattern, and obtaining a first classification of the noisy pattern based on processing of the noisy pattern by a first clone of the machine learning algorithm performed by the protection node. The operations may also include obtaining a second classification of the original pattern based on forwarding the request for processing of the original pattern by the machine learning algorithm performed by the pattern classification node. Further, the operations may include comparing the first and second classifications to determine whether the first and second classifications satisfy a defined similarity rule. The operations may further include using the comparison to manage the request from the user node.

According to some embodiments, a computer program may be provided that includes instructions which, when executed on at least one processor, cause the at least one processor to carry out methods performed by the protection node.

According to some embodiments, a computer program product may be provided that includes a non-transitory computer readable medium storing instructions that, when executed on at least one processor, cause the at least one processor to carry out methods performed by the protection node.

Operational advantages that may be provided by one or more the embodiments are that by comparing the first and second classifications to determine whether the first and second classifications satisfy a defined similarity rule and managing the request of the user node when the first and second classifications do not satisfy the defined similarity rule, the protection node may protect the pattern classification node from malicious requests.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
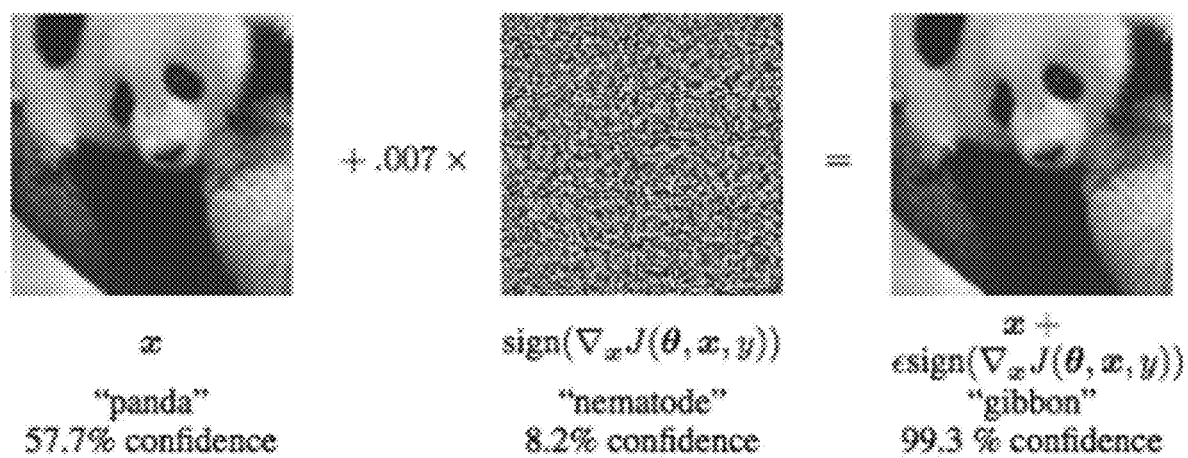
FIG. 1 is an example illustrating noise added to a panda picture and then fed back to a Convolutional Neural Network (CNN, VGG-16) to incorrectly categorize it as a gibbon.

Some of the embodiments contemplated herein will now be described more fully with reference to the accompanying drawings. Other embodiments, however, are contained within the scope of the subject matter disclosed herein, and the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

One approach to shield neural networks from malicious attacks may be a Generative Adversarial Networks (GAN) where the initial training data set may be enhanced by random noise, thereafter relabeled and then may be used again to train the original neural network with augmented ("noisy") input thus improving the original neural network. A limitation of this approach is that it may require the generation of an entirely new dataset which can take time, all while the initial neural network is still up and running and still susceptible to such attacks. Additionally, such an approach may not take into consideration already known malicious input that may have successfully confused the neural network in the past.

Certain aspects of the present disclosure and their embodiments may provide solutions to these and/or other challenges. According to some embodiments, a method may keep track of such malicious requests from a user node sent towards a machine learning algorithm, may record the actions/intent of the malicious request and may either allow the malicious user to consider that it has tricked a machine learning algorithm successfully, block the requests, or monitor the requests for potential future blocking. Since malicious requests may be recorded, they may be used in the background to efficiently improve and fortify the initial machine learning algorithm being protected without the attacker's knowledge.

In some embodiments, an enhanced hypertext transfer protocol (http) proxy network node may handle machine learning (ml)-based http requests and add noise to patterns in the requests.

Maliciously added noise may not be random noise. Maliciously added noise may be a modification to input that looks like noise but may be a well chosen modification to explore weaknesses of the machine learning algorithm/ model (e.g. overfitting to training data) to deceive the machine learning model to make a wrong prediction. In some embodiments, random noise may be added to the input containing malicious modifications to disrupt the impact of the modifications from causing the machine learning algorithm to make the classification expected by the malicious modifications. The addition of a small amount of random noise to a general non-maliciously modified input should not impact the results of classifications. If the output of running the machine learning algorithm on user input with added random noise and without random noise deviates significantly that may indicate that the input either has malicious modifications or the input may represent a corner case that may be wrongly interpreted by the machine learning algorithm. In either case, in some embodiments, the user who sent the request containing the input may be recorded and the input from the user may be used to retrain the machine learning algorithm.

Figure 2:
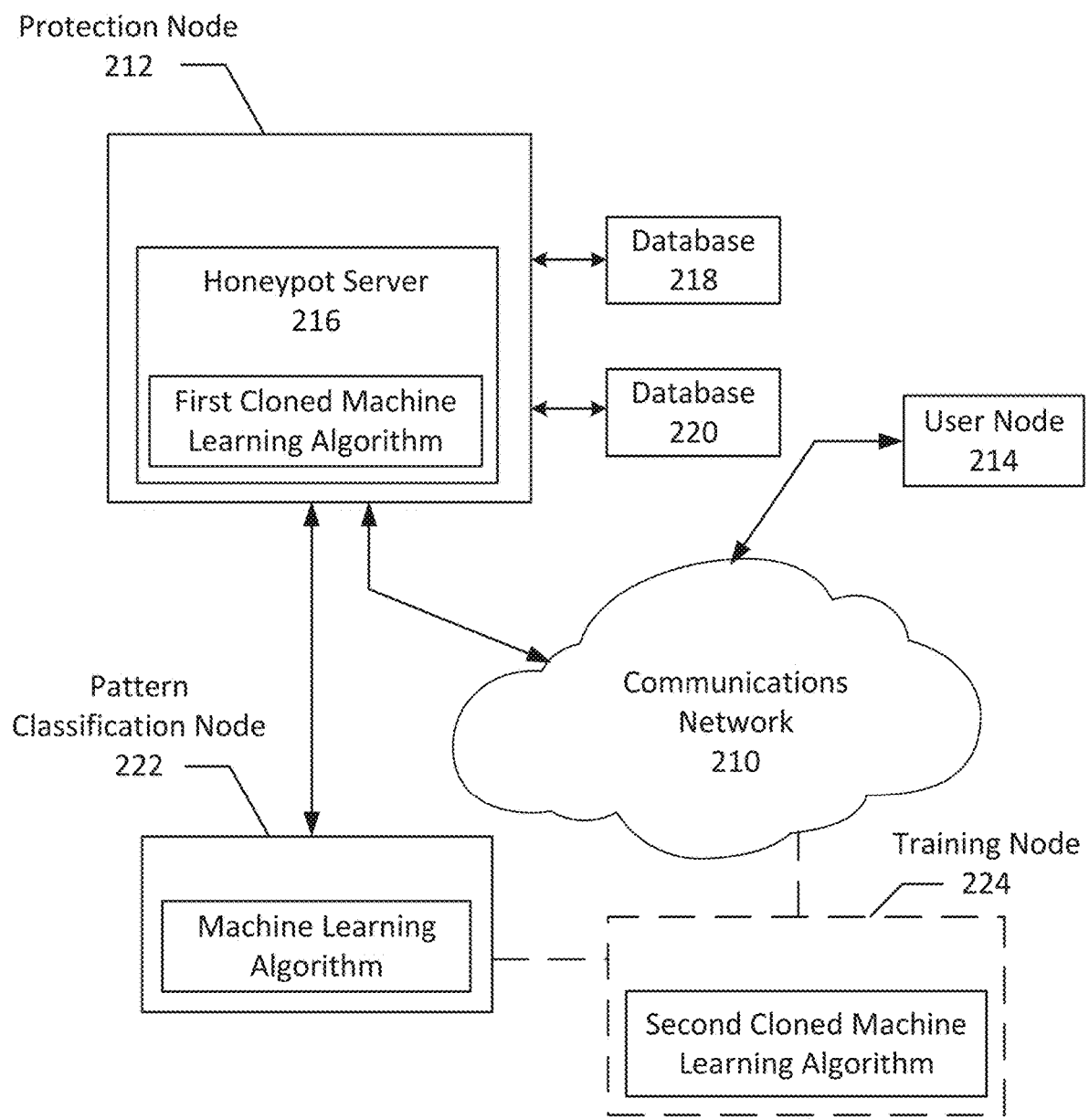
FIG. 2 is a schematic diagram illustrating a protection node for protecting a pattern classification node from malicious requests according to some embodiments of inventive concepts.

FIG. 2 is a schematic diagram illustrating a protection node 212 for protecting a pattern classification node 222 that includes a machine learning algorithm from malicious requests according to some embodiments of inventive concepts. A machine learning algorithm may be a machine learning-based algorithm/model that includes inputs from which predictions, classifications, or decisions are expressed as outputs by follow programming instructions executed by a processor. The machine learning algorithm may include any form of machine learning algorithm, including a neural network. Although the subject matter described herein may be implemented in any appropriate type of system using any suitable components, the embodiments disclosed herein are described in relation to a pattern classification node 222 that includes a machine learning algorithm, and a protection node 212 that includes a honeypot server 216 that performs a first clone of the machine learning algorithm that resides at pattern classification node 222. A clone of the machine learning algorithm may be executed and modified without directly affecting the machine learning algorithm residing at pattern classification node 222. Honeypot server 216 may be set up as a decoy to lure malicious attackers/user nodes that send malicious requests toward pattern classification node 222. Honeypot server 216 may be a hypertext transfer protocol (http) proxy for pattern classification node 222. Honeypot server 216 may handle machine learning (ml)-based http requests received via communications network 210. By including a clone of the machine learning algorithm residing at pattern classification node 222 at honeypot server 216, protection node 212 may mimic pattern classification node 222. By mimicking pattern classification node 222, protection node 212 may receive requests sent by user node 214 towards pattern classification node 222.

Further, honeypot server 216 may protect pattern classification node 222 from malicious requests sent from a user node 214 toward the pattern classification node 222. The requests may attempt to cause pattern classification node 222 to make an incorrect classification of an original pattern included in the request from user node 214. As discussed in more detail below, honeypot server 216 may perform the first clone of the machine learning algorithm. Protection node 212 may obtain identifying information on a user node that sends a request that is received by protection node 212, and may provide information from the request from user node 214 to training node 224 to train a second clone of the machine learning algorithm residing at training node 224 in the background. Honeypot server 216 may be collocated at protection node 212. Alternatively, honeypot server 216 may be at a separate location on communications network 210 with a network connection to protection node 212. Further, honeypot server 216 may include multiple honeypot servers set on communications network 210 that form a single honeypot server.

For simplicity, FIG. 2 only depicts one pattern classification node 222 that includes a machine learning algorithm. In practice, a communications network 210 may further include any additional elements suitable to support the machine learning algorithm, such as any other pattern classification node or neural network node.

For simplicity, FIG. 2 further only depicts protection node 212 for protecting pattern classification node 222 from malicious attacks sent toward pattern classification node 222. In practice, any additional elements suitable to support protection of pattern classification node 222, such as any other node or device of a neural network. FIG. 2 also only depicts one user node 214. In practice, communications network 210 may further include additional user nodes. In addition, while FIG. 2 depicts two separate databases 218 and 220, the databases may reside in a single database structure and/or additional databases may be included.

Protection node 212 may be, but is not limited to, a node that includes a computer, a honeypot server, and a clone of the machine learning algorithm residing at pattern classification node 222 as further discussed below with reference to FIG. 6. Protection node 212 Protection node 212 may be in communication with user node 214. Protection node 212 may receive requests from user node 214 sent towards pattern classification node 222. Protection node 212 also may be in communication with pattern classification node 222 and training node 224. Communication with training node 224 may be direct via communications network 210 or indirectly via pattern classification node 222. Protection node 212 also may be in communication with database 218 to store and/or collect an identifier associated with user node 214 to distrust list in database 218 as discussed further below. Further, protection node 212 also may be in communication with database 220 to store and/or collect information obtained from a request from user node 214 as discussed further below.

Figure 3:
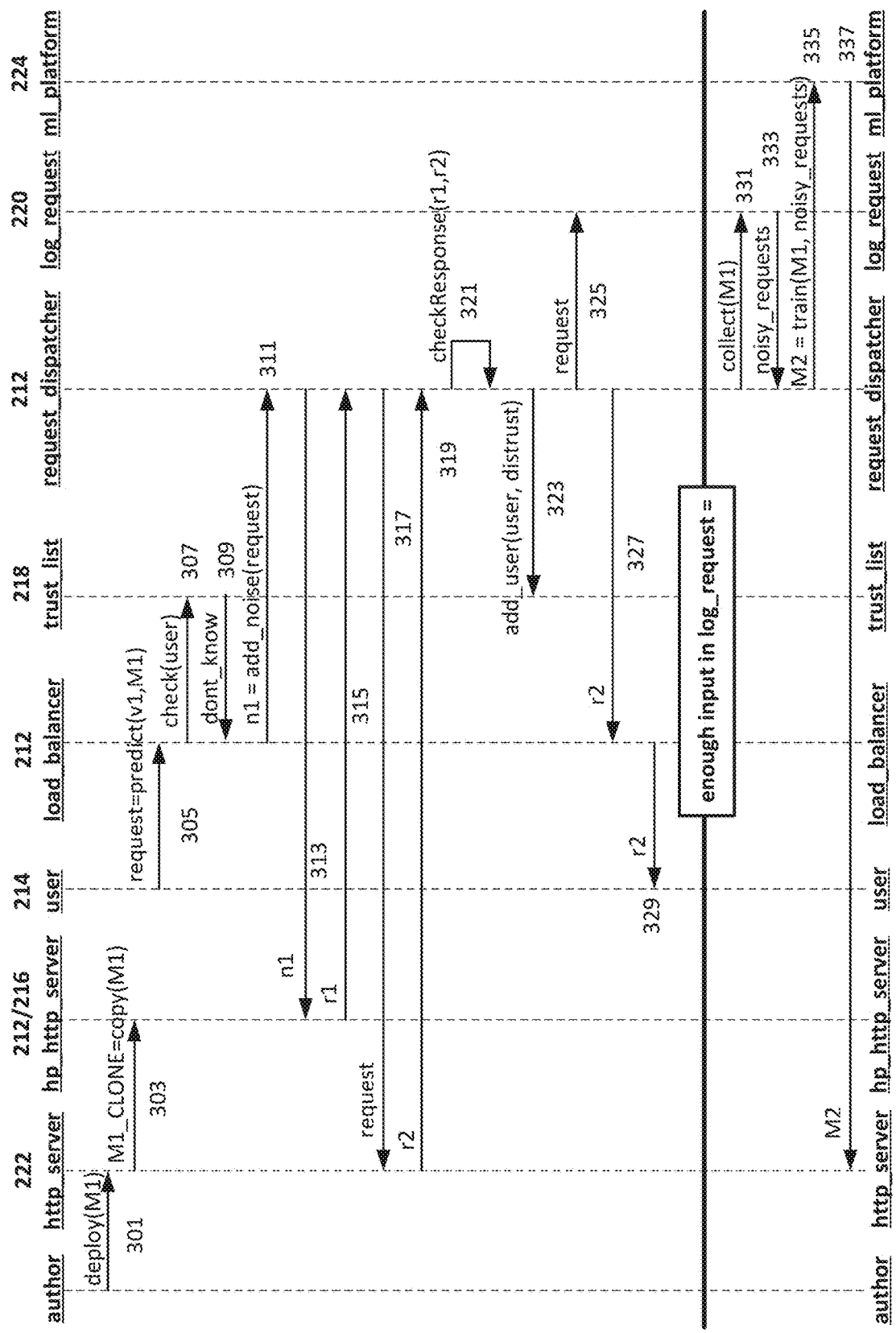
FIG. 3 is a message diagram illustrating operations/messages of a protection node for protecting a pattern classification node according to some embodiments of inventive concepts.
Figure 4:
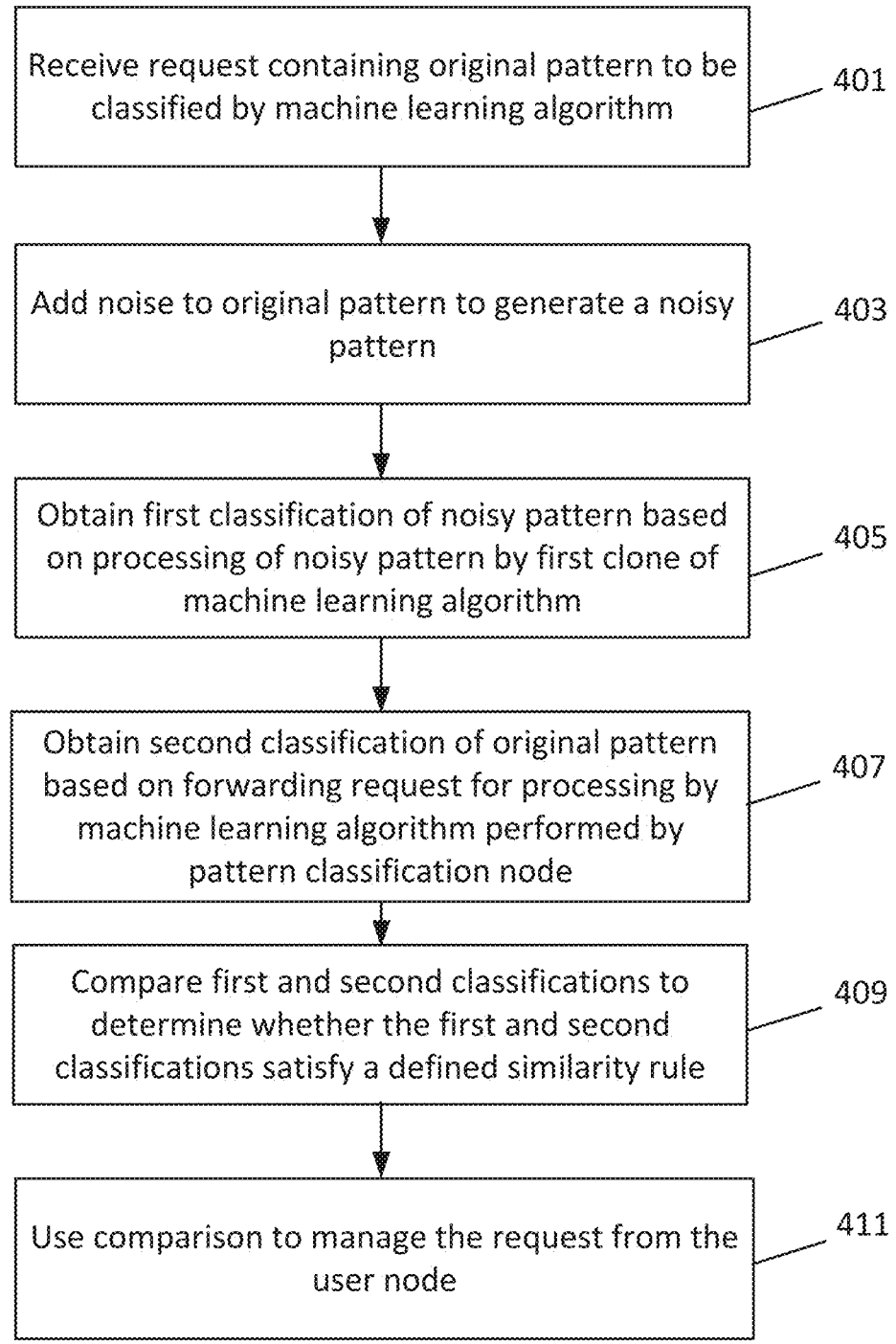
FIG. 4 is a flow chart illustrating operations of a protection node according to some embodiments of inventive concepts.
Figure 5:
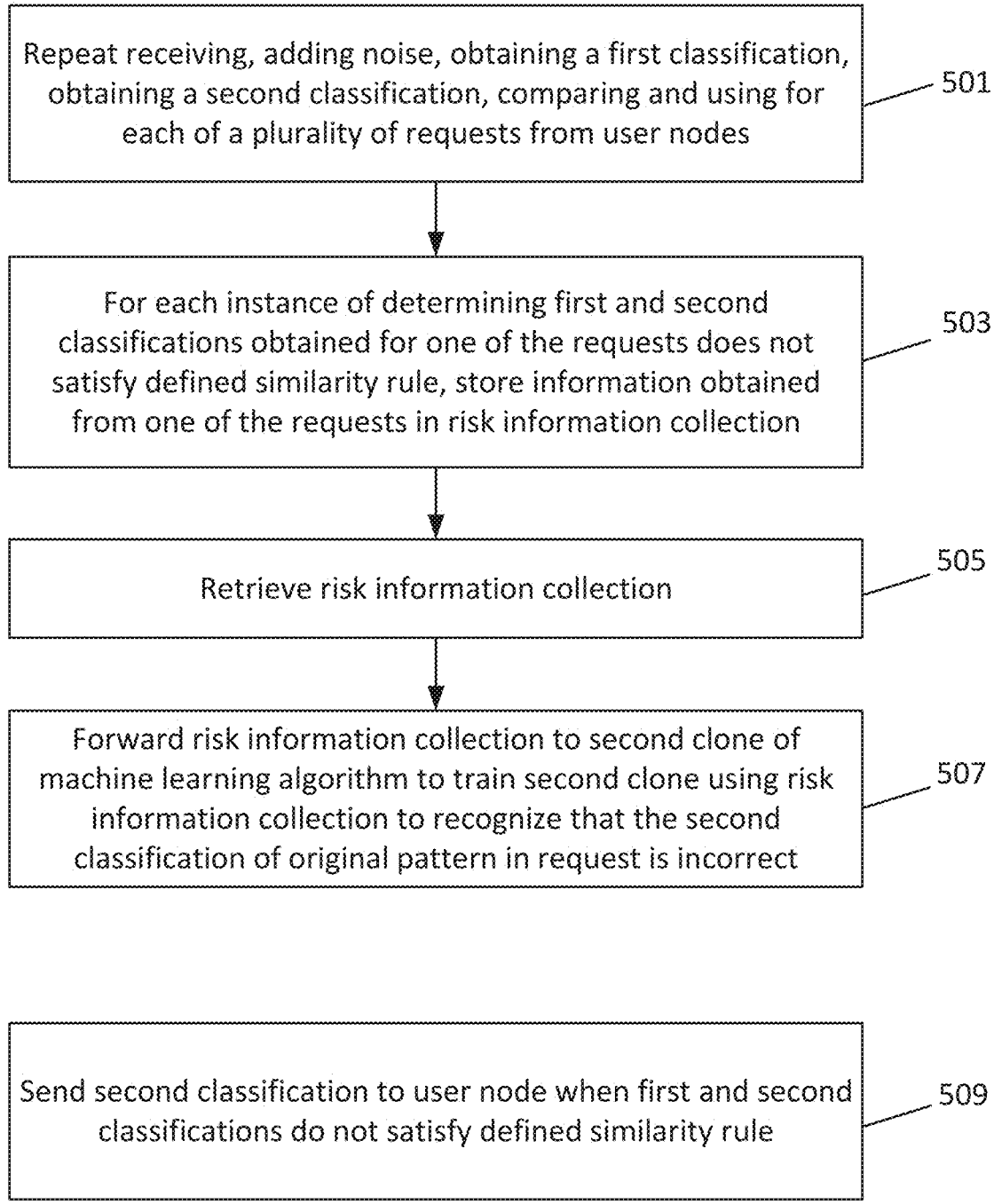
FIG. 5 is a flow chart illustrating operations of a protection node according to some embodiments of inventive concepts.
Figure 6:
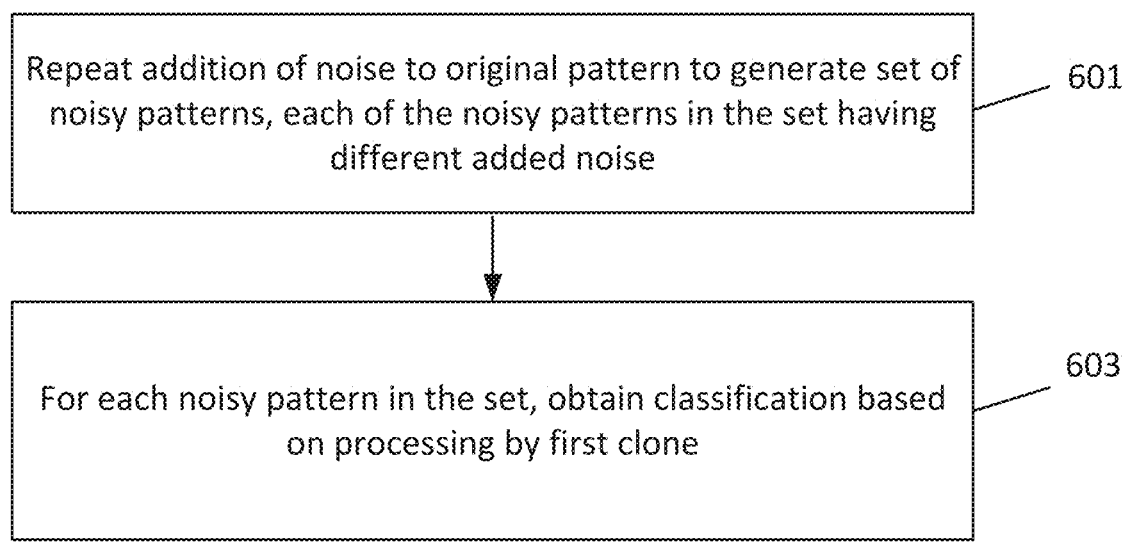
FIG. 6 is a flow chart illustrating operations of a protection node according to some embodiments of inventive concepts.

These and other related operations that may be performed by a protection node 212 are now described in the context of the message diagram of FIG. 3 and the operational flowcharts of FIGS. 4-6.

FIG. 3 illustrates an example in which a machine learning algorithm residing at pattern classification node 222 may not have any prior information about the intents of requests from a user node nor a machine learning model that has been trained in a way to avoid malicious requests. This is denoted in FIG. 3 by the white_list output 309 which is "dont_know" and also by the clone of the machine learning algorithm 303 residing in honey pot http server 216 which may be the same as the original machine learning algorithm 301 residing at pattern classification node 222.

An HTTP server is an exemplary host for the original machine learning algorithm including, without limitation, Tensorflow serving or other examples, or machine learning runtimes.

Continuing with reference to FIG. 3, according to some embodiments, at 301, an author of a machine learning algorithm may deploy the machine learning algorithm on an http server (e.g., deploy(M1)). The http server may be located at, but is not limited to, network node 222. A clone of the machine learning algorithm may be deployed at a honeypot http server at 303 (e.g., M1_CLONE=copy(M1)). The honeypot http server may be located at protection node 212.

At 305, user node 214 may transmit a request toward pattern classification node 222 that may be received at a load balancer (e.g., request=predict(v1,M1)) of protection node 212. The request may include an original pattern to be classified by the machine learning algorithm residing at pattern classification node 222. The original pattern may include, but is not limited to, an image, a video frame, an audio sample, and a data stream sample (e.g., a photograph, optical characters, images of human faces, handwriting, speech, fingerprints, text, shapes, etc.). At 307, the load balancer may check a white list of identifiers associated with user nodes and/or users in database 218 to determine whether an identifier associated with user node 214 is an unknown user (e.g., check(user)). At 309, the load balancer may determine that the identifier associated with user node 214 is an unknown user (e.g., don't_know). At 311, the load balancer may send a request to a request dispatcher to add noise to the original pattern included in the request from user node 214 (e.g., n1=add_noise(request)). The request dispatcher may be included in protection node 212.

At 313, the request dispatcher may add noise to the original pattern to generate a noisy pattern and may send the noisy pattern to honeypot server 216 (e.g., n1). At 315, honeypot server 216 may make a first classification of the noisy pattern based on processing of the noisy pattern by a first clone of the machine learning algorithm (e.g., r1).

At 317, the request dispatcher may send a request to the machine learning algorithm residing at pattern classification node 222 to classify the original pattern included in the request from user node 214. At 319, the request dispatcher may receive a classification of the original pattern from the machine learning algorithm (e.g., a second classification) based on processing of the original pattern by the machine learning algorithm performed by pattern classification node 222 (e.g., r2).

At 321, the request dispatcher may compare the first and second classifications to determine whether the first and second classifications satisfy a defined similarity rule (e.g., checkResponse(r1,r2)). The defined similarity rule may include a rule that that the first and second classifications match, substantially match, do not match, do not substantially match, or have a defined amount of similarity. At 323, the request dispatcher may determine that the first and second classifications do not satisfy the defined similarity rule, for example because they do not substantially match. When the first and second classifications do not satisfy the defined similarity rule, the request dispatcher may send an instruction to database 218 to add the identifier associated with user node 214 to a distrust (e.g., add_user(user, distrust)). The distrust list may be, but is not limited to, stored in database 218. Database 218 may be connected directly or indirectly to communications network 210, or may be included in protection node 212. By adding the identifier associated with user node 214 to the distrust list, requests from user node 214 sent toward pattern classification node 222 may be blocked or monitored for potential future blocking.

At 325, when the first and second classifications do not satisfy the defined similarity rule, the request dispatcher may send an instruction to store the request in a log request (e.g., request). The log request may be, but is not limited to, stored in database (220). Database 220 may be a connected directly or indirectly to communications network 210, or may be included in protection node 212.

At 327, the request dispatcher may send an instruction to the load balancer to send the second classification to user node 214 because the first and second classifications do not satisfy the defined similarity rule (e.g., r2). At 329, the load balancer may send the second classification to user node 214 (e.g., r2). By sending the second classification to user node 214, user node 214 may consider or determine that it has successfully tricked the machine learning algorithm residing at pattern classification node 214 to make an incorrect classification of the original pattern included in the request sent from user node 214.

At 331, the request dispatcher may send a request to the log request at database 2220 to collect the stored request from the log request (e.g., collect(M1)). At 333, the log request may send the stored request to the request dispatcher (e.g., noisy_requests). At 335, the request dispatcher may send a request to training node 224. Training node 224 may include a second clone of the machine learning algorithm residing at pattern classification node 222. The request sent to training node 224 may include a request to train the second clone of the machine learning algorithm to obtain a result using the stored request retrieved from database 220 that the second classification of the original pattern in the request from user node 214 is incorrect (e.g., M2=train(M1, noisy_requests)). At 337, training node 224 may send the result of the training to the machine learning algorithm at pattern classification node 222. The result may include that the machine learning algorithm recognizes that the second classification of the original pattern in the request from user node 214 is incorrect. Since the log request at database 220 may include a record of the request from user node 214, the second clone of the machine learning algorithm at training node 224 may use the request from user node 214 in the background to improve and fortify the machine learning algorithm residing at pattern classification node 222 being protected without user node 214 being aware of the background training.

It will be appreciated that the message/operation sequence shown in FIG. 3 is for purposes of example, and other embodiments may modify the sequence and/or order of the sequence without deviating from the scope of inventive concepts. Furthermore, it will be appreciated that multiple requests from one or more user nodes may be included in the messages/operations.

Figure 7:
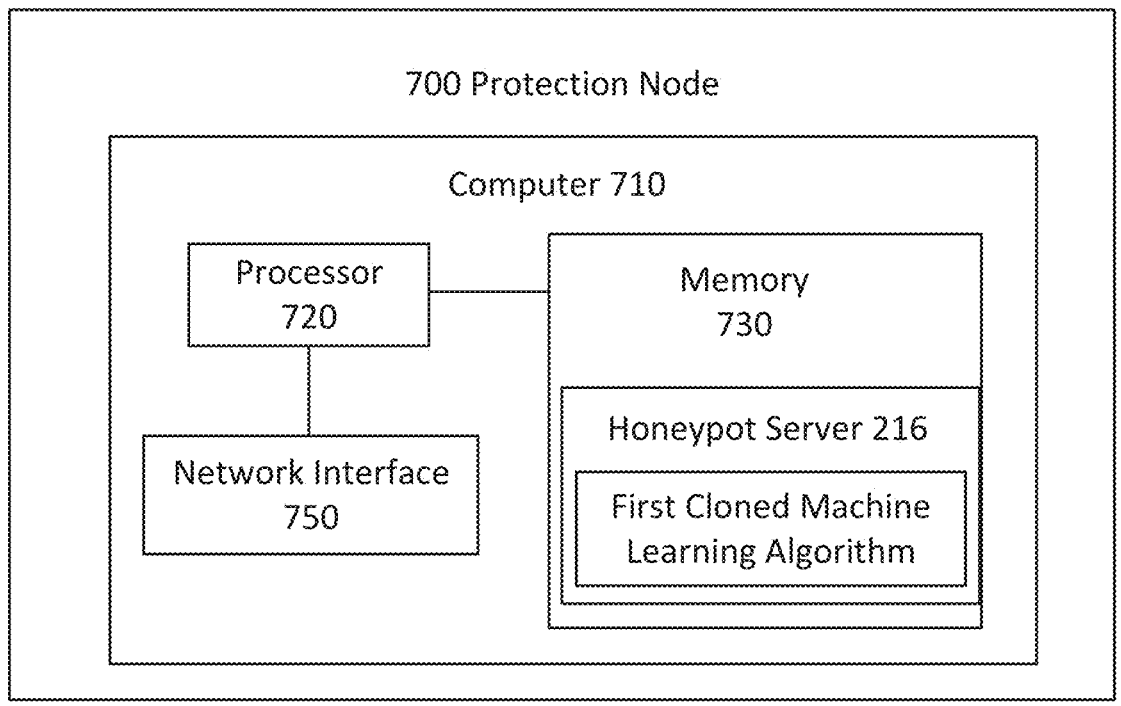
FIG. 7 is a block diagram illustrating a protection node according to some embodiments of inventive concepts.

Operations of protection node 700 (e.g., a computer 710, etc.) for protecting pattern classification node 222 from malicious requests will now be disclosed with reference to the flow charts of FIGS. 4-6. For example, protection node 212 may be implemented using structure of protection node 700 from FIG. 7 with a computer 710 having honeypot server 216 in memory 730. Honeypot server 216 includes a first clone of the machine learning algorithm program residing at pattern classification node 222. Protection node 710 has the first cloned machine learning algorithm residing in honeypot server 216 in memory 730 protection node 700 so that when instructions of memory 730 of protection node 700 are executed by processor 720 of protection node 700, processor 720 performs respective operations discussed below with respect to FIGS. 4-6.

Processor 720 of protection node 700 may thus send and/or receive communications to/from one or more nodes/entities/servers of communications network 210 (e.g., nodes 214, 222, and 224 and/or databases 218 and 220) through interface 750 of protection node 600.

Referring initially to FIG. 4, at block 401, processor 720 of protection node 700 (e.g., protection node 212) may receive a request from user node 214 containing an original pattern to be classified by the machine learning algorithm residing at pattern classification node 222 (e.g., 305 in FIG. 3).

At block 403, processor 720 of protection node 700 may add noise to the original pattern to generate a noisy pattern (e.g., 311 in FIG. 3).

At block 405, processor 720 of protection node 700 may obtain a first classification of the noisy pattern based on processing of the noisy pattern by a first clone of the machine learning algorithm at protection node 700 (e.g., 313, 315 in FIG. 3). Processor 720 of protection node 700 may obtain the first classification by sending a request to the clone of the machine learning algorithm residing in honeypot server 216 to classify the noisy pattern (e.g., 313 in FIG. 3); and may receive the first classification of the noisy pattern from the clone of the machine learning algorithm (e.g., 315 in FIG. 3).

At block 407, processor 720 of protection node 700 may obtain a second classification of the original pattern based on forwarding the request for processing of the original pattern by the machine learning algorithm performed by pattern classification node 222. Processor 720 of protection node 700 may receive the second classification of the pattern from the machine learning algorithm (e.g., 319 in FIG. 3).

At block 409, processor 720 of protection node 700 may compare the first and second classifications to determine whether the first and second classifications satisfy the defined similarity rule (e.g., 321 in FIG. 3).

At block 411, processor 720 of protection node 700 may use the comparison to manage the request from user node 214. Processor 720 of protection node 700 may use the comparison to manage the request from user node 214 in several ways.

For example, processor 720 of protection node 700 add an identifier associated with user node 214 to a distrust list in first database (218) when the first and second classifications do not satisfy the defined similarity rule, wherein the protection node blocks, or monitors for potential future blocking, requests received from identifiers contained in the distrust list before being forwarded to the pattern classification node 222 (e.g., 323 in FIG. 3). Additionally, processor 720 of protection node 700 may send the second classification to user node 214 when the first and second classifications do not satisfy the defined similarity rule (e.g., 327 and 329 in FIG. 3; 509).

In addition, referring to FIG. 5, processor 720 of protection node 700 may repeat the receiving (e.g., 305, 501), the adding noise (e.g., 311, 501), the obtaining a first classification (e.g., 313, 315, 501), the obtaining a second classification (e.g., 317, 319, 501), and the comparing (e.g., 321, 501). For each instance of determining that the first and second classifications obtained for one of the requests does not satisfy the defined similarity rule, storing (e.g., 325, 503) information obtained from the one of the requests in a risk information collection contained in second database (220). Processor 720 of protection node 700 may retrieve (e.g., 333, 505) the risk information collection from the second database (220). Processor 720 of protection node 700 may retrieve (e.g., 333, 505) the risk information collection from the second database (220). Processor 720 of protection node 700 may forward (e.g., 335, 507) the risk information collection to a second clone of the machine learning algorithm at a training node (224) to train the second clone of the machine learning algorithm using the risk information collection to recognize that the second classification of the original pattern in the request is incorrect. Training node 224 may forward the results of the training to pattern classification node 222 for the machine learning algorithm residing at pattern classification 222 to recognize that the second classification of the original pattern in the request is incorrect.

Referring to FIG. 6, processor 720 of protection node 700 may repeat (e.g., 311, 601) the addition of noise to the original pattern to generate a set of noisy patterns, each of the noisy patterns in the set may have different added noise. For each of the noisy patterns in the set, processor 720 of protection node 700 may obtain (e.g., 313, 315, 603) a classification based on processing by the first clone of the machine learning algorithm performed by protection node 212. The comparing (e.g., 321) may include performing comparisons of the second classification to each of the classifications for the set of noisy patterns to determine whether the second classification compared to each of the classifications for the set of noisy patterns satisfy the defined similarity rule. The using (e.g., 323, 325, 327, 329, 331, 333, 335, 337, 411) may include using the comparisons to manage the request from user node 214.

Various operations of FIG. 4 may be optional with respect to some embodiments. For example, operations of block 413 may be optional according to some embodiments. Further, the operations of FIGS. 5 and 6 may be optional. Additionally, it will be appreciated that the operation sequence shown in FIGS. 4-6 are for purposes of example, and other embodiments may modify the sequence and/or order of the sequence without deviating from the scope of inventive concepts. Furthermore, it will be appreciated that multiple requests from one or more unknown users may be included in the operations.

Figure 8:
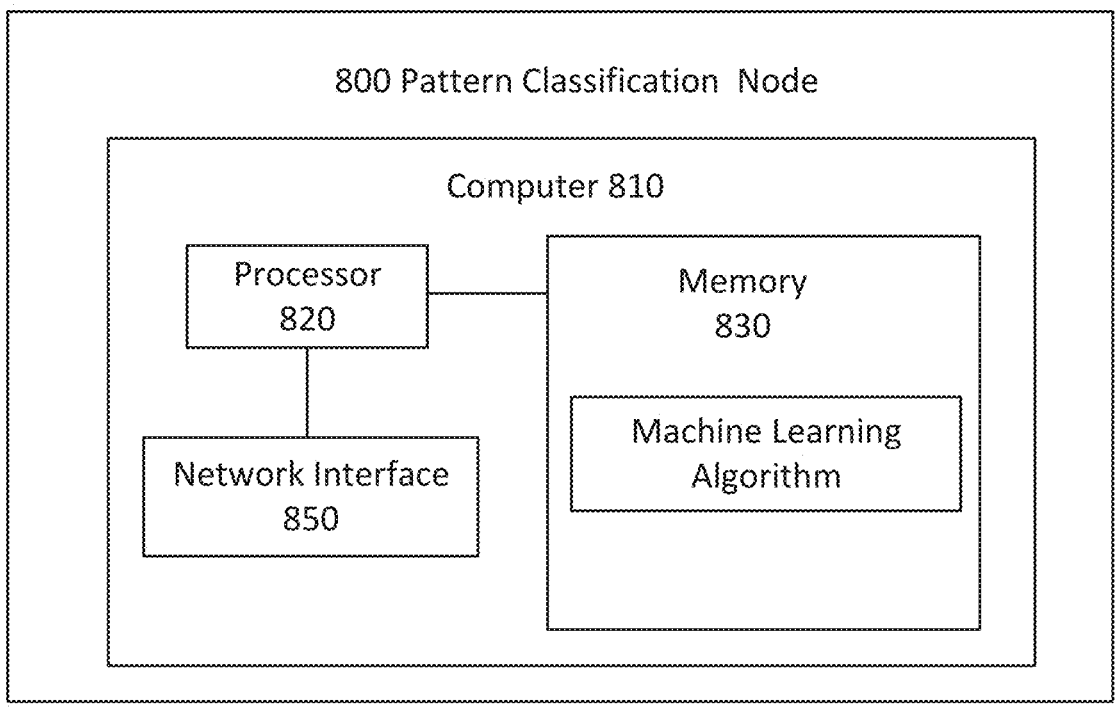
FIG. 8 is a block diagram illustrating a pattern classification node according to some embodiments of inventive concepts.

FIG. 8 is a block diagram illustrating pattern classification node 800 (e.g., a computer 810, etc.) for deploying the first clone of the machine learning algorithm at protection node 212; generating the second classification of the original pattern from user node 214 based on processing of the original pattern by the machine learning algorithm residing at pattern classification node 222; and receiving the result of further training in the background by training node 224 to recognize that the second classification of the original pattern in the request from user node 214 is incorrect. For example, pattern classification node 222 may be implemented using structure of pattern classification node 800 from FIG. 8 with a computer 810 having the machine learning algorithm in memory 830 so that when instructions of memory 830 of pattern classification node 800 are executed by processor 820 of pattern classification node 800, processor 820 performs respective operations discussed above with respect to FIG. 3. Processor 820 of protection node 800 may thus send and/or receive communications to/from one or more nodes/entities/servers of communications network 210 (e.g., nodes 212, 214, and 224 and/or databases 218 and 220) through interface 850 of pattern classification node 800.

Although various embodiments have been described in which the machine learning algorithm, and the first and second clones of the machine algorithm, reside as software in memory, the machine learning algorithm and clones may alternatively or additionally be embodied in analog circuitry and/or discrete digital circuitry (e.g., ASIC).

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a protection node for protecting a pattern classification node from malicious requests, the method comprising:
  receiving, from a user node a request containing an original pattern to be classified by a machine learning algorithm performed by the pattern classification node;
  adding noise to the original pattern to generate a noisy pattern;
  obtaining a first classification of the noisy pattern based on processing of the noisy pattern by a first clone of the machine learning algorithm performed by the protection node;
  obtaining a second classification of the original pattern based on forwarding the request for processing of the original pattern by the machine learning algorithm performed by the pattern classification node;
  comparing the first and second classifications to determine whether the first and second classifications satisfy a defined similarity rule; and
  using the comparison to manage the request from the user node.

2. The method of claim 1, wherein using the comparison to manage the request from the user node comprises:
  adding an identifier associated with the user node to a distrust list in a first database when the first and second classifications do not satisfy the defined similarity rule, wherein the protection node blocks, or monitors for potential future blocking, requests received from identifiers contained in the distrust list before being forwarded to the pattern classification node.

3. The method of claim 1, further comprising:
  repeating the receiving, the adding noise, the obtaining a first classification, the obtaining a second classification, the comparing;
  for each instance of determining that the first and second classifications obtained for one of the requests does not satisfy the defined similarity rule, storing information obtained from the one of the requests in a risk information collection contained in a second database;
  retrieving the risk information collection from the second database; and
  forwarding the risk information collection to a second clone of the machine learning algorithm at a training node to train the second clone of the machine learning algorithm using the risk information collection to recognize that the second classification of the original pattern in the request is incorrect.

4. The method of claim 1, wherein using the comparison to manage the request from the user node comprises:
  sending the second classification to the user node when the first and second classifications do not satisfy the defined similarity rule.

5. The method of claim 1, wherein the pattern comprises one of: an image, a video frame, an audio sample, and a data stream sample.

6. The method of claim 2, wherein the first database and the second database reside in a single database structure.

7. The method of claim 1, wherein the machine learning algorithm is a neural network.

8. The method of claim 1, wherein the protection node comprises a honeypot server that performs the first clone of the machine learning algorithm.

9. The method of claim 1 further comprising:
  repeating the addition of noise to the original pattern to generate a set of noisy patterns, each of the noisy patterns in the set having different added noise;
  for each of the noisy patterns in the set, obtaining a classification based on processing by the first clone of the machine learning algorithm performed by the protection node;
  wherein the comparing comprises performing comparisons of the second classification to each of the classifications for the set of noisy patterns to determine whether the second classification compared to each of the classifications for the set of noisy patterns satisfy the defined similarity rule,
  wherein the using comprises using the comparisons to manage the request from the user node.

10. A protection node comprising:
at least one processor;
at least one memory connected to the at least one processor and storing program code that is executed by the at least one processor to perform operations comprising:
receive, from a user node, a request containing an original pattern to be classified by a machine learning algorithm performed by the pattern classification node;
add noise to the original pattern to generate a noisy pattern;
obtain a first classification of the noisy pattern based on processing of the noisy pattern by a first clone of the machine learning algorithm performed by the protection node;
obtain a second classification of the original pattern based on forwarding the request for processing of the original pattern by the machine learning algorithm performed by the pattern classification node;
compare the first and second classifications to determine whether the first and second classifications satisfy a defined similarity rule; and
use the comparison to manage the request from the user node.

11. The protection node of claim 10, wherein use the comparison to manage the request from the user node comprises:
add an identifier associated with the user node to a distrust list in a first database when the first and second classifications do not satisfy the defined similarity rule, wherein the protection node blocks, or monitors for potential future blocking, requests received from identifiers contained in the distrust list before being forwarded to the pattern classification node.

12. The protection node of claim 10, wherein the operations further comprise:
repeating the receive, the add noise, the obtain a first classification, the obtain a second classification, the compare;
for each instance of determining that the first and second classifications obtained for one of the requests does not satisfy the defined similarity rule, store information obtained from the one of the requests in a risk information collection contained in a second database;
retrieve the risk information collection from the second database; and
forward the risk information collection to a second clone of the machine learning algorithm at a training node to train the second clone of the machine learning algorithm using the risk information collection to recognize that the second classification of the original pattern in the request is incorrect.

13. The protection node of claim 10, wherein use the comparison to manage the request from the user node comprises:
send the second classification to the user node when the first and second classifications do not satisfy the defined similarity rule.

14. The protection node of claim 10, wherein the pattern comprises one of: an image, a video frame, an audio sample, and a data stream sample.

15. The protection node of claim 11, wherein the first database and the second database reside in a single database structure.

16. The protection node of claim 10, wherein the machine learning algorithm is a neural network.

17. The protection node of claim 10, wherein the protection node comprises a honeypot server that performs the first clone of the machine learning algorithm.

18. The protection node of claim 10 wherein the operations further comprise:
repeat the addition of noise to the original pattern to generate a set of noisy patterns, each of the noisy patterns in the set having different added noise;
for each of the noisy patterns in the set, obtain a classification based on processing by the first clone of the machine learning algorithm performed by the protection node;
wherein the compare comprises perform comparisons of the second classification to each of the classifications for the set of noisy patterns to determine whether the second classification compared to each of the classifications for the set of noisy patterns satisfy the defined similarity rule,
wherein the use comprises use the comparisons to manage the request from the user node.

19. A computer program product comprising:
a non-transitory computer readable medium storing instructions, when executed on at least one processor causes the at least one processor to carry out operations comprising:
receive, from a user node, a request containing an original pattern to be classified by a machine learning algorithm performed by the pattern classification node;
add noise to the original pattern to generate a noisy pattern;
obtain a first classification of the noisy pattern based on processing of the noisy pattern by a first clone of the machine learning algorithm performed by the protection node;
obtain a second classification of the original pattern based on forwarding the request for processing of the original pattern by the machine learning algorithm performed by the pattern classification node;
compare the first and second classifications to determine whether the first and second classifications satisfy a defined similarity rule; and
use the comparison to manage the request from the user node.

20. The computer program product of claim 19, wherein the non-transitory computer readable medium storing instructions, when executed on at least one processor causes the at least one processor to carry out further operations comprising:
repeating the receive, the add noise, the obtain a first classification, the obtain a second classification, the compare;
for each instance of determining that the first and second classifications obtained for one of the requests does not satisfy the defined similarity rule, store information obtained from the one of the requests in a risk information collection contained in a second database;
retrieve the risk information collection from the second database; and
forward the risk information collection to a second clone of the machine learning algorithm at a training node to train the second clone of the machine learning algorithm using the risk information collection to recognize that the second classification of the original pattern in the request is incorrect.

* * * * *